United States Patent [19]

Hishida

[11] 4,266,634

[45] May 12, 1981

[54] BRAKING DEVICE

[75] Inventor: Tadashi Hishida, Sakai, Japan

[73] Assignee: V.I.V. Engineering Co., Ltd., Japan

[21] Appl. No.: 57,374

[22] Filed: Jul. 13, 1979

[51] Int. Cl.³ ............................................. F16D 51/22
[52] U.S. Cl. ...................................... 188/75; 188/80
[58] Field of Search ........................... 188/75, 80, 262

[56] References Cited

U.S. PATENT DOCUMENTS

| 1,528,841 | 3/1925 | Myers | 188/80 X |
| 1,928,558 | 9/1933 | Crissinger | 188/80 |
| 2,073,626 | 3/1937 | Filippis | 188/80 |

FOREIGN PATENT DOCUMENTS 1152750  9/1957  France ........................................ 188/80

Primary Examiner—Duane A. Reger
Attorney, Agent, or Firm—Wenderoth, Lind & Ponack

[57] ABSTRACT

A braking device including a circular rotor coaxially fixed to the shaft of a rotary machine, a brake drum made of a material for elastic deformation and mounted on the rotor, and rollers interposed between the circular rotor and the brake drum. The rollers are adapted for rotation around the axis of the rotor as long as the brake drum maintains circularity, and adapted to be locked between the rotor and the brake drum when the brake drum is caused to deviate from circularity.

5 Claims, 4 Drawing Figures

BRAKING DEVICE

The present invention relates to a braking device.

With conventional braking devices, it has been a common practice to employ a brake drum upon which the brake shoe or brake band is pressed or to employ a brake disk upon which the brake pad is pressed.

A disadvantage of these conventional braking devices is that they inevitably employ a complex mechanism.

Another disadvantage of the conventional braking devices is that the force required for the operator to develop a strong braking power is so great in some cases that the operator requires means for gaining mechanical advantage.

It is an object of the present invention to obviate the above-mentioned disadvantages.

It is also an object of the present invention to provide a braking device of simple structure and yet capable of developing a strong braking power.

It is another object of the present invention to provide a braking device which requires a little force from an operator to develop a strong braking power.

It is still another object of the present invention to provide a braking device which requires only a simple operation to develop a strong braking power.

With these objects in view, the present invention will be more clearly understood from the following description in connection with the accompanying drawings, in which.

Figure 1:
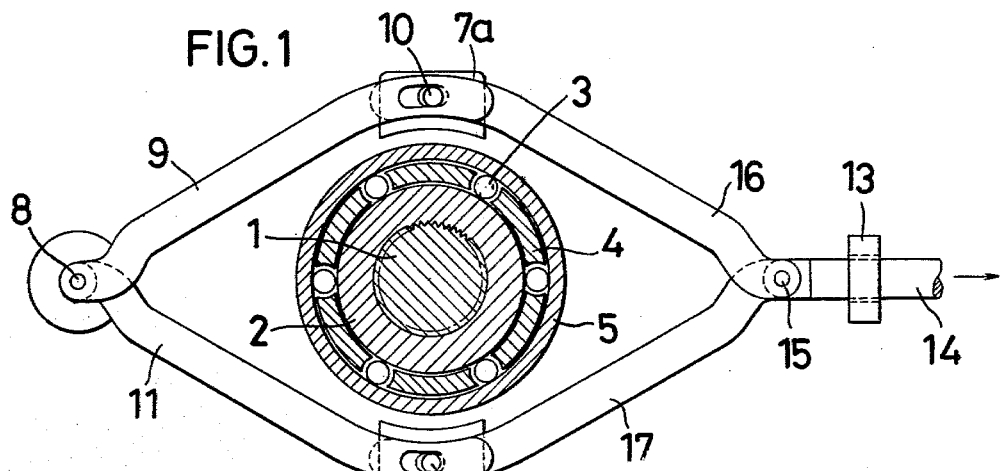
FIG. 1 is an elevation partly in vertical section of an embodiment of the present invention.
Figure 2:
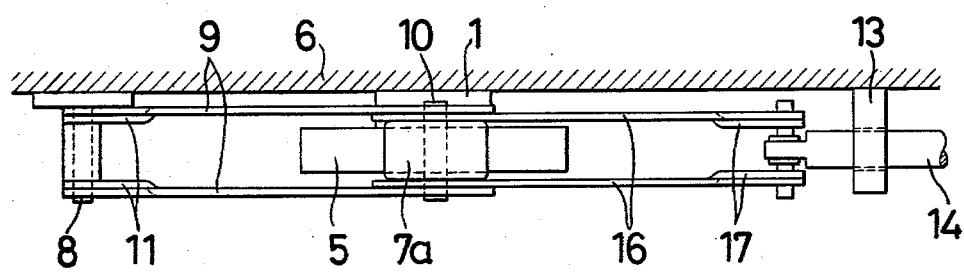
FIG. 2 is a plan view of the same.

Referring now to FIGS. 1 and 2, the braking device in accordance with the present invention includes a circular rotor 2 fixed to one end of a shaft 1 of a rotary machine 6 coaxially therewith, a brake drum 5 surrounding the rotor 2, rollers 3 interposed between the rotor 2 and the brake drum 5, and spacers 4 holding the rollers 3 at regular intervals.

The rotor 2 and the rollers 3 are preferably made of the same kind of steel as that customarily used for the inner races, rollers and balls of roller or ball bearings. The brake drum 5 is made of a material capable of elastic deformation, such as carbon fiber reinforced plastics.

A fixed pin 8 is provided on the machine frame 6 in the proximity of the shaft 1 so as to be parallel to the axis of the shaft 1. Two pairs of upper links 9 and 16 are pivotally jointed together end to end by means of an upper joint pin 10. Two pairs of lower links 11 and 17 are likewise pivotally jointed together end to end by means of a lower joint pin 12. The other end of the pair of the upper links 9 and that of the pair of the lower links 11 are pivotally mounted on the fixed pin 8. The other end of the pair of the upper links 16 and that of the pair of the lower links 17 are pivotally connected to one end of a control rod 14 by means of a coupling pin 15. An upper brake shoe 7a is mounted on the upper joint pin 10 so as to be held between the upper links 9 and also between the upper links 16 over the brake drum 5. A lower brake shoe 7b is similarly mounted on the lower joint pin 12 so as to be held between the lower links 11 and also between the lower links 17 under the brake drum 5. The control rod 14 passes through a guide 13 which is fixed to the machine frame 6.

As long as the brake shoes 7a and 7b are kept apart from the brake drum 5, the brake drum 5 maintains circularity and the rotation of the rotor 2 on its axis permits smooth revolution of the rollers 3 around the axis of the rotor 2.

When the control rod 14 is pulled rightwardly as shown in FIG. 1, the upper links 9 and 16 and the lower links 11 and 17 tend to approach toward each other and cause the brake shoes 7a and 7b to be pressed hard against the brake drum 5. Since the brake drum 5 is made of a material capable of elastic deformation, the pressure applied to the brake drum 5 by the brake shoes 7a and 7b causes the brake drum 5 to deviate from circularity into a slightly elliptic shape. As a consequence, the rollers 3 are held tightly between the rotor 2 and the brake drum 5 in the areas directly affected by the pressure. Indirect but tight contact thus established between the rotor 2 and the brake shoes 7a and 7b through the rollers 3 and the brake drum 5 causes the rotor 2 to undergo a braking force.

When the control rod 14 is driven in a reverse direction, the brake shoes 7a and 7b move out of contact with the brake drum 5. Then the brake drum 5 will recover circularity because of its own elasticity and allow the rotor 2 to resume smooth rotation.

Figure 3:
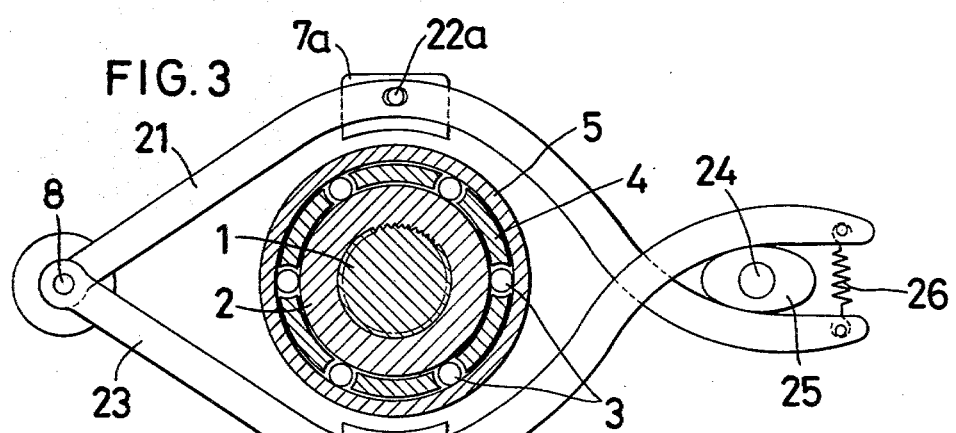
FIG. 3 is an elevation partly in vertical section of another embodiment of the present invention.
Figure 4:
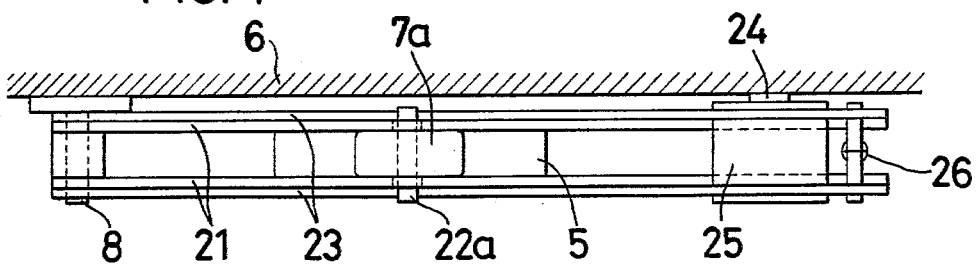
FIG. 4 is a plan view of the same.

Referring now to FIGS. 3 and 4, another embodiment of the present invention includes a pair of upper links 21 and a pair of lower links 23. One end of each of these pairs is pivotally mounted on the fixed pin 8, and the other end portion of the upper links 21 crosses that of the lower links 23, with an elliptical cam 25 held between the two end portions. The upper brake shoe 7a is mounted on a pin 22a so as to be held between the upper links 21 over the brake drum 5. The lower brake shoe 7b is mounted on a pin 22b so as to be held between the lower links 23 under the brake drum 5.

As long as the major axis of the elliptical cam 25 remains horizontal, the brake shoes 7a and 7b are kept apart from the brake drum 5, because the ends of the upper and lower links 21 and 23 are urged toward each other by a tension coil spring 26.

When the elliptical cam 25 is turned so as to make its major axis vertical, the ends of the upper and lower links 21 and 23 are spread out and thereby the brake shoes 7a and 7b are pressed hard against the brake drum 5. Then the rotor 2 undergoes a braking force on the same principle as in the first embodiment.

In either of the embodiments, for a rotary machine which requires an abrupt application of a brake, some means for facilitating the stoppage of rotation of the brake drum 5 should preferably be provided. For gradual application of a braking force, the brake drum 5 may be allowed to freely rotate.

Thus the present invention has an advantage of simple structure, easy operation and a little force required to cause the braking device to develop a strong braking power.

It is to be noted that balls may be used in place of the rollers 3.

While I have disclosed a few embodiments of the present invention, it is to be understood that they have been given by way of example only and not in a limiting sense, the scope of the present invention being determined by the objects and the claims.

What I claim is:

1. A braking device comprising a circular rotor coaxially fixed to the shaft of a rotary machine, a brake drum made of a material capable of elastic deformation and mounted on said circular rotor, balls or rollers interposed between said brake drum and said circular rotor, spacers arranged between said balls or rollers for holding said rollers at regular intervals, said balls or rollers adapted for rotation around the axis of said rotor as long as said brake drum maintains circularity and adapted to be locked between said brake drum and said circular rotor when said brake drum is caused to deviate from circularity, and a means for causing said brake drum to deviate from circularity.

2. The braking device as set forth in claim 1, wherein said means for causing said brake drum to deviate from circularity comprises a pin fixed on a frame of said rotary machine so as to be parallel to said shaft of said rotary machine, two pairs of upper links pivotally jointed together end to end by means of an upper joint pin, two pairs of lower links likewise pivotally jointed together end to end by means of a lower joint pin, the other end of one pair of upper links and that of one pair of lower links being pivotally mounted on said fixed pin, the other end of the other pair of upper links and that of the other pair of lower links being pivotally connected to one end of a control rod, an upper brake shoe mounted on said upper joint pin so as to be held between said two pairs of upper links over said brake drum, a lower brake shoe mounted on said lower joint pin so as to be held between said two pairs of lower links under said brake drum, and a means for moving said control rod along a line perpendicular to a line linking said upper joint pin with said lower joint pin.

3. The braking device as set forth in claim 1, wherein said means for causing said brake drum to deviate from circularity comprises a pin fixed on a frame of said rotary machine so as to be parallel to the axis of said shaft of said rotary machine, a pair of upper links, a pair of lower links, one end of said upper links and of said lower links being pivotally mounted on said fixed pin, the other end portion of said upper links crossing that of said lower links, a cam means held between said other end portions of the upper and lower links, a tension coil spring urging said other ends portions toward each other, an upper brake shoe mounted on said upper links so as to be held therebetween over said brake drum, a lower brake shoe mounted on said lower links so as to be held therebetween under said brake drum, and a means for turning said cam in such a direction as to bring said other end portions away from each other.

4. The braking device as set forth in any one of claims 1 to 3, wherein balls are used.

5. The braking device as set forth in any one of claims 1 to 3 wherein rollers are used.

* * * * *